(12) United States Patent
Binder et al.

(10) Patent No.: US 7,744,944 B2
(45) Date of Patent: *Jun. 29, 2010

(54) METHODS OF PRODUCING RESISTANT STARCH AND PRODUCTS FORMED THEREFROM

(75) Inventors: Thomas P. Binder, Decatur, IL (US); James A. McClain, Bettendorf, IA (US)

(73) Assignee: Archer-Daniels-Midland Company, Decatur, IL (US)

( * ) Notice: Subject to any disclaimer, the term of this patent is extended or adjusted under 35 U.S.C. 154(b) by 982 days.

This patent is subject to a terminal disclaimer.

(21) Appl. No.: 10/959,792

(22) Filed: Oct. 6, 2004

(65) Prior Publication Data

US 2006/0073263 A1    Apr. 6, 2006

(51) Int. Cl.
*C08B 30/00* (2006.01)
(52) U.S. Cl. ...................................... 426/661; 536/102
(58) Field of Classification Search .................. 426/536; 536/102, 111; 124/67, 70, 71
See application file for complete search history.

(56) References Cited

U.S. PATENT DOCUMENTS

| | | | |
|---|---|---|---|
| 853,828 A | 5/1907 | Reynolds | |
| 2,014,799 A | 9/1935 | Fuller | |
| 2,287,599 A | 6/1942 | Bulfer et al. | |
| 2,503,053 A | 4/1950 | Kerr | |
| 2,845,368 A | 7/1958 | Fredrickson | |
| 4,549,909 A | 10/1985 | Samuel et al. | |
| 5,281,276 A | 1/1994 | Chiu et al. | |
| 5,336,328 A | 8/1994 | Mauro et al. | |
| 5,358,729 A * | 10/1994 | Ohkuma et al. ............. | 426/567 |
| 5,364,652 A | 11/1994 | Ohkuma et al. | |
| 5,430,141 A | 7/1995 | Ohkuma et al. | |
| 5,472,732 A | 12/1995 | Ohkuma et al. | |
| 5,593,503 A | 1/1997 | Shi et al. | |
| 5,620,873 A | 4/1997 | Ohkuma et al. | |
| 5,629,036 A | 5/1997 | Yanetani et al. | |
| 5,849,090 A | 12/1998 | Haralampu et al. | |
| 5,902,410 A | 5/1999 | Chiu et al. | |
| 6,013,299 A | 1/2000 | Haynes et al. | |
| 6,090,594 A | 7/2000 | Kettlitz et al. | |
| 6,191,116 B1 | 2/2001 | Kasica et al. | |
| 6,274,567 B1 | 8/2001 | Brown et al. | |
| 6,303,174 B1 | 10/2001 | McNaught et al. | |

| | | | |
|---|---|---|---|
| 2001/0026827 A1* | 10/2001 | Klingler et al. ............. | 426/578 |
| 2004/0167325 A1 | 8/2004 | McClain | |

FOREIGN PATENT DOCUMENTS

| | | |
|---|---|---|
| EP | 0463935 | 2/1992 |
| EP | 0540421 | 5/1993 |
| EP | 0 652 701 B1 | 1/2002 |
| JP | 08009953 | 1/1996 |
| WO | WO 90/15147 | 12/1990 |
| WO | WO 94/03049 | 2/1994 |
| WO | WO 99/64466 | 12/1999 |
| WO | WO 03010277 | 2/2003 |
| WO | WO 2004/074326 | 9/2004 |

OTHER PUBLICATIONS

Ernst, R.C., Watkins, C.H., Ruwe, H.H. 1936. "The Physical Properties of the Ternary System Ethyl Alcohol-Glycerin-Water." The Journal of Physical Chemistry. vol. 40 (5). pp. 627-635.*
"Instant Gratification", Sep. 1999 Printed from http://www.foodproductdesign.com/archive/1999/0999cs.html.
"Pass the Powdered Beans", Jul. 2000 Printed from http://www.backpacker.com/article/1,2646,1162_P,00.html.
"Entrees for a Small Planet", May 2002 Printed from http://www.foodproductdesign.com/archive/2002/0502CS.html.
"New 2005 Food Pyramid Information", Nov. 2005 Printed from http://www.ring.com/health/food/food.htm.
Nutritional Value and Composition of Canned Beans, Nov. 2005 Printed from http://www.nebraskabrybean.com/nutrition.htm.
"Junk Food Laws Take Aim at Child Obesity", Nov. 2005 Printed from http://www.sacbee.com/content/politics/ca/story/13567361p-14407868c.html.
"The Salsa Saga", Apr. 1998 Printed from http://www.foodproductdesign.com/archive/1998/0498AP.html.
"Development of Biotechnology to Produce Low-Flatulence Dehydrated Pinto Bean Products" http://www.northarvestbean.org/html/news.cfm?ID=450.

(Continued)

*Primary Examiner*—Keith D Hendricks
*Assistant Examiner*—Nikki H Dees
(74) *Attorney, Agent, or Firm*—K&L Gates LLP

(57) ABSTRACT

A method for the production of resistant starch comprising acidifying unmodified starch to an optimal pH with an acid-alcohol mixture to convert the unmodified starch to resistant starch when at a reaction temperature, heating the acidified unmodified starch to about the reaction temperature, and maintaining the acidified unmodified starch close to about the reaction temperature until the resistant starch has been obtained while maintaining a whiteness level within a predetermined range. Resistant starches and food products manufactured therefrom are also disclosed.

25 Claims, No Drawings

OTHER PUBLICATIONS

"You Don't Know Beans About Legume Flours", Nov. 2005 Printed from http://www.foodprocessing.com/articles/2005/400.html.
Specification sheet for Refried Black Beans, Nov. 2005 Printed from http://www.admworld.com/naen/productdb/details.asp?code=448.
Specification sheet for Whole Black Beans, Nov. 2005 Printed from http://www.admworld.com/naen/productdb/details.asp?code=451.
"Nutrition and Your Health: Dietary Guidelines for Americans", Nov. 2005 Printed from http://www.health.gov/dietaryguidelnes/dga2005/report/HTML/A_ExecSummary.htm.
Specification sheet for Black Bean Flour, Nov. 2005 Printed from http://www.bobsredmill.com/catalog/index.php?action=showdetails&product_ID=71.
"Inhibition of the Phosphatidylinositol 3-Kinase/Akt Pathway by Inositol Pentakisphosphate Results in Antiangiogenic and Antitumor Effects", Sep. 2005, *Cancer Research*, vol. 65 Printed from www.aacrjournals.org.
"My Pyramid Steps to a Healthier You", Apr. 2005.
Specification sheet for Smooth Style Refried Pinto Bean, Mar. 2004.
"Will Canada Nix Nuggets and Fries?", Sep. 2005 Printed from http://www.theglobeandmail.com/servlet/ArticieNews/TPStory/LAC/20050929/HJUNKF ....
"Effect of Processing on Some Chemical and Nutritional Characteristics of Pre-cooked and Dehydrated Legumes," *Plant Foods for Human Nutrition*, vol. 41, pp. 193-201, 1991.
Smith, L.T. et al., "Dextrinization of Potato Starch with Gaseous Hydrogen Chloride," *Industrial and Engineering Chemistry*, American Chemical Society, U.S., vol. 36, 1944, pp. 1052-1054.
Wurzburg, O.B., "Modified Starches: Properties and Uses", CRC Press Inc., Boca Raton, FL (1986), pp. 33-34.

Geerdes, J.D. et al., "The Constitution of Corn Starch Dextrin", *J. Am. Chem. Soc.*, (1957), vol. 79, pp. 4209-4212.
Christensen, G.M. et al., "The Constitution of Wheat Starch Dextrin", *J. Am. Chem. Soc.*, (1957), vol. 79, pp. 4492-4495.
Tomasik, P. et al., "The Thermal Decomposition of Carbohydrates. Part II. The Decomposition of Starch", Advances in Carbohydrate Chemistry, (1990), vol. 47, pp. 279-343.
European Patent Office Form PCT/ISA/210—International Search Report for International Application No. PCT/US2005/028518, European Patent Office (acting as International Searching Authority), issued Dec. 23, 2005, 3 pages.
European Patent Office Form PCT/ISA/237—Written Opinion of the ISA for International Application No. PCT/US2005/028518, European Patent Office (acting as International Searching Authority), issued Dec. 23, 2005, 5 pages.
Laurentin, et al., "*Preparation of Indigestible Pyrodextrins from Different Starch Sources*," *Journal of Agricultrual and Food Chemistry*, 51:18, pp. 5510-5515 (2003).
Specification sheet for Edible Beans, printed from http://www.admworld.com.
Phytate Degradation Determines the Effect of Industrial Processing and Home Cooking on Iron Absorption from Cereal-based Foods, *British Journal of Nutrition*, vol. 88, pp. 117-123, 2002.
"Crossing Borders: Designing for the Hispanic Demographic", *Food Product Design*, Sep. 2004.
Search results for gluten free items, Sep. 2005 Printed from http://www.bobsredmill.com/catalog/index.php?action=do_search&keywords=8,condition....

* cited by examiner

METHODS OF PRODUCING RESISTANT STARCH AND PRODUCTS FORMED THEREFROM

BACKGROUND

1. Field of the Invention

This invention relates to the production of resistant starch and products formed therefrom and; in particular, to methods of improving the yield of resistant starch in a dextrin reaction by, for example, adding an effective amount of an alcohol component during the acidification process.

2. Background

Starch is a naturally occurring polymer made up of anhydroglucose units and is obtained by processing plant materials. The plant materials from which starch is derived include, but are not limited to corn, wheat, potato, cassava, and rice. Of these plant materials, corn is one of the most commonly used sources for starch in North America.

Starch is used in a wide number of applications, both industrial and private. These uses include food products, papermaking, corrugated boxes, glue, baby powder, and textiles. Food products produced from starch are varied and include dextrose, corn syrup, high fructose corn syrup, crystalline dextrose, fructose, xanthan gum, citric acid, lactic acid, sorbitol, lysine, threonine, riboflavin, and distilled spirits.

An additional product is resistant starch, which is a name given to starches which resist digestion in the human body. Resistant starch is an important part of the human diet and has been shown to promote intestinal regularity, moderate postprandial blood glucose levels, and lower serum cholesterol and triglyceride levels. Resistant starch can be obtained by the manufacture of pyrodextrins, which are made at low moisture and low pH by the action of heat and an acid catalyst, such as hydrochloric acid, to produce a slightly yellow powder. Typically, the acid catalyst is added through atomization and spraying of a water-diluted acidic solution containing the acid.

Starch consists primarily of alpha 1,4- and alpha 1,6-glucosidic linkages. Resistant starches can be prepared by heat treating a starch at a high temperature. However, the mechanism of resistant starch development is complex. During the initial stages of dextrinization, acid-catalyzed hydrolysis occurs. This is followed by a recombination of the fragments to form branched structures. Specifically, the dextrinization process converts a portion of the normal alpha 1,4-glucosidic linkages to random 1,2-, 1,3-, and 1,4-alpha or beta linkages. These chemical changes are described in "Modified Starches: Properties and Uses", O. B. Wurzburg, CRC Press, Inc. 1986, pp. 33-34.

These branched structures containing the new bonds are not digestible by maltase and isomaltase in the small intestine. This is because the human digestive system effectively digests only alpha 1,4-linkages. The majority of the resistant starch reaches the large intestine, and thus is characterized as a "dietary fiber," defined as components of plant material in the diet that are resistant to digestion by enzymes produced by humans in the small intestine.

In the preparation of resistant starch in dextrin, heat, acid, and time are employed to rearrange the molecular structure to form indigestible branched structures. This also results in the development of color attributed to the carmelization reactions. Carmelization reactions are a diverse group of dehydration, fragmentation, and polymerization reactions whose reaction rates are dependent on temperature and pH (See, "Sugar Chemistry", R. S. Shallenberger and G. G. Birch, AVI, 1975, pp. 167-177). The dextrinized starch will typically take on a yellow color depending on the specifics of the reaction conditions.

It is preferable that the finished dextrinized product be almost colorless in solution due to the application of this product in the food industry. In the majority of cases, any color developed in the dextrinization process is not desirable in the final product and is largely removed through subsequent, and costly, decolorization steps. In order to minimize the costs associated with color removal, a dextrinized starch with minimal color development would be advantageous.

However, development of resistant starch in dextrin typically occurs contemporaneously with color development as the dextrinization reaction progresses. Also, prior to dextrinization and during the acidification process when a water-diluted acidic solution is atomized and sprayed on the starch, localized concentrations of acid lead to charring of the starch, thus contributing to color development in addition to carmelization reactions. The object, however, is to manufacture a dextrin with the greatest degree of resistant starch possible while minimizing the objectionable color formation.

In actual operation, there are two tests that measure color. The first test is a whiteness meter and is run on dry dextrin samples. An example of a whiteness meter is a Kett Electric Laboratory Whiteness meter, model C-1, with a range of 0 to 100, where 0 represents the darkest and 100 represents the whitest points on the scale. The second test employs a spectrophotometer to measure the color of a dextrin sample dissolved in water in the form of a slurry at ten percent dry solids. In the second test, higher levels of absorbance indicate a more colored product. The absorbance is monitored by a spectrophotometer at wavelengths of 420 and 720 nm, with the difference being multiplied by ten and recorded as the color.

When a process to manufacture resistant starch is designed, the design parameters take into account both a whiteness value and an absorbance color value of the dextrin because the decolorization steps such as carbon treatment can only treat a certain amount of color bodies before recharging. In order to keep costs at economic levels, the dextrinized starch must not be too colored. For example, it has been found that by maintaining a whiteness value about 65 and an absorbance color value of 20 or lower, the subsequent decolorization steps result in an end product that is economically viable.

The object of the dextrinization process is to produce a dextrin containing the highest yield of resistant starch possible while maintaining a whiteness value above 65 and a spectrophotometer color below 20. Although other whiteness and absorbance color targets can be used, these targets require either more or less equipment to remove the color depending on whether it is less colored (less equipment and materials) or more colored (additional equipment and materials).

BRIEF SUMMARY OF THE INVENTION

The present invention addresses one or more of the above-mentioned needs by providing methods of producing resistant starch, resistant starches formed therefrom, and food products employing the same. In one embodiment, the method comprises acidifying unmodified starch to an optimal pH with an acid-alcohol mixture to convert the unmodified starch to resistant starch when at a reaction temperature, heating the acidified unmodified starch to about the reaction temperature, and maintaining the acidified unmodified starch close to about the reaction temperature until the resistant starch has been obtained while maintaining a whiteness level within a predetermined range.

In another embodiment, the present invention provides a method of producing resistant starch. The method comprises acidifying unmodified starch with an amount of acid-alcohol mixture to an optimal pH and at a reaction temperature, wherein the amount of the acid-alcohol is selected relative to the pH and the reaction temperature to convert the unmodified starch to resistant starch when at the pH and the reaction temperature. The acidified unmodified starch is heated to about the reaction temperature. The acidified unmodified starch is maintained close to about the reaction temperature such that the maximum yield of resistant starch may be obtained while maintaining a whiteness level within a predetermined range.

The present invention also provides a resistant starch formed from a process, and a food product manufactured from the resistant starch. The process comprises acidifying unmodified starch with an amount of acid-alcohol mixture to an optimal pH and at a reaction temperature, wherein the amount of the acid-alcohol is selected relative to the pH and the reaction temperature to convert the unmodified starch to resistant starch when at the pH and the reaction temperature. The acidified unmodified starch is heated to about the reaction temperature. The acidified unmodified starch is maintained close to about the reaction temperature such that the maximum yield of resistant starch may be obtained while maintaining a whiteness level within a predetermined range.

It should be understood that this invention is not limited to the embodiments disclosed in this summary, but it is intended to cover modifications that are within the spirit and scope of the invention, as defined by the appended claims.

DETAILED DESCRIPTION OF EMBODIMENTS OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements. Furthermore, when numerical ranges of varying scope are set forth herein, it is contemplated that any combination of these values inclusive of the recited values may be used.

All references cited herein, including journal articles or abstracts, published or corresponding U.S. or foreign patent applications, issued or foreign patents, or any other references, are each entirely incorporated by reference herein, including all data, tables, figures, and text presented in the cited references. However, any patent, publication, or other disclosure material, in whole or in part, that is said to be incorporated by reference herein is incorporated herein only to the extent that the incorporated material does not conflict with existing definitions, statements, or other disclosure material set forth in this disclosure.

All of the dextrinization reactions discussed herein are performed on dried granular starch. The term "starch" refers to polymeric compounds composed of anhydroglucose units. These compounds are derivatives of plant material and may be isolated from sources that include, but are not limited to corn, wheat, potato, cassava, and rice. The term "dextrinization" refers to the process of heating dried granular starch in the presence of an acid catalyst leading to partial hydrolysis of the starch polymer and subsequent recombination of the fragments into branched structures.

The term "resistant starch" refers to components of plant material in the diet that are resistant to digestion by enzymes produced by humans in the small intestine. Resistant starch in the dextrinized starch may be measured by High Performance Liquid Chromatography (HPLC) as that portion of the original dextrinized starch greater than a degree of polymerization of two after digestion with glycoamylase at pH 4.5 and 60° C. for 24 hours.

The term "whiteness" refers to a reading that is obtained on dry dextrin using a specific whiteness meter. The whiteness meter employed for purposes of the present invention is the Kett Electric Laboratory Whiteness meter, commercially available as Model C-1 from Kett Electric Laboratory, Tokyo, Japan, with a range of 0 to 100, where 0 represents the darkest and 100 represents the whitest points on the scale.

The term "color" refers to the absorbance of a dextrin slurried in deionized water at ten percent dry solids. The absorbance is monitored by a spectrophotometer at wavelengths of 420 and 720 nm, wherein the difference is multiplied by ten and recorded as the color.

The term "acid catalyst" refers to a chemical that effects the rate of a reaction, and may be, but is not limited to, hydrochloric acid, chlorine gas or monochloroacetic acid. The term "acid-alcohol mixture" refers to the combination of varying amounts of an acid component and an alcohol component, which may be, but is not limited to, hydrochloric acid and ethanol. The acid component and the alcohol component may, but need not, be combined prior to addition as a pre-mix.

The present invention provides methods of producing a pyrodextrin containing high amounts of resistant starch while maintaining a low level of color development. The present invention employs an acid-alcohol mixture to acidify unmodified starch prior to dextrinization, rather than an acid-water mixture, to enhance resistant starch development. In addition to providing relatively high resistant starch yields, charring of starch due to elevated local concentration of acid is eliminated or substantially reduced, resulting in a starch having a lower level of color development when measured in a water slurry.

The unmodified starch may be derived from numerous sources known to those skilled in the art. In some embodiments, the unmodified starch may be derived from corn, potatoes, rice, cassava, wheat, or combinations thereof. The moisture content of the unmodified starch feedstock may be within any range suitable for dextrinization reactions and may be obtained by various methods known in the art, such as, for example, by drying the feedstock to the appropriate moisture levels. All of the dextrinization reactions discussed herein are performed on dried granular starch. The term "dried granular starch" refers to starch that need not be moisture free, but may have moisture inherent in the starch while retaining its granular, free flowing characteristics. In some embodiments, the moisture content of the unmodified starch may be between 1% and 15% and may range from 1% to 5%. In some embodiments, the unmodified starch may be acidified before the moisture content is reduced to between 1% and 15%. While the work was performed at initial starch moisture of 3%, a person skilled in the art will be able to use the present invention to find an alcohol addition level at a given pH and temperature for a given initial starch moisture that will increase resistant starch content and eliminate charred starch.

In the present invention, starch may be acidified at a desired pH with an acid-alcohol mixture containing an acid component and an alcohol component, and then heated to a suitable reaction temperature such that a maximum amount of resistant starch can be produced while maintaining an acceptable color.

The use of an acid-alcohol mixture to acidify starch prior to dextrinization, rather than an acid-water mixture, shows unexpected results. It was discovered that for a given temperature and pH, by increasing the amount of alcohol used during acidification, the amount of resistant starch could be increased and that there was an optimum amount of alcohol to be sprayed onto the starch prior to roasting in order to maximize resistant starch development. It was also unexpectedly discovered that the use of an acid-alcohol mixture to acidify starch prior to dextrinization rather than an acid-water mixture may result in the elimination of charred starch because of the more effective distribution of acid such that areas of high acid concentration are minimized. As a consequence, the slurried color of the product may be reduced.

The present invention is directed to methods of producing resistant starch. One method includes selecting a reaction temperature, acidifying unmodified starch to a pH with an acid-alcohol mixture to convert the unmodified starch to resistant starch when at the reaction temperature, heating the acidified unmodified starch to about the reaction temperature, and maintaining the acidified unmodified starch close to about the reaction temperature until the resistant starch has been obtained while maintaining a whiteness level within a predetermined range.

Various acid catalysts may be used in the acidification of the unmodified starch. In some embodiments, the unmodified starch may be acidified with an acid-alcohol pre-mix. The acid-alcohol mixture may include any suitable alcohol component and may be, for example, those alcohols that are miscible in water, such as, for example, ethanol, methanol, propanol, isopropanol, butanol, and combinations thereof. Various effective amounts of alcohol component may be added to the unmodified starch, and varies based on, for example, the type and of alcohol employed and the optimal pH desired. For example, when ethanol is employed as the alcohol component, and the predetermined pH is set at 2.3, ethanol at 190 proof may be added to the starch in amounts that range from 0.001 mils/g of starch to 0.4 mils/g of starch or greater, may range from 0.023 mils/g of starch to 0.083 mils/g starch, and may be 0.043 mils/g of starch.

The acid component of the acid-alcohol mixture may be any suitable acid known to those of skill in the art, such as, for example, hydrochloric acid, chlorine gas, and monochloroacetic acid. In some embodiments, the acid component may be aqueous hydrochloric acid. In further embodiments, the acid component may be gaseous hydrochloric acid. Various effective amounts of acid component may be added to the unmodified starch, and varies based on, for example, the optimal pH desired and the type, concentration, and physical state of acid employed. For example, when aqueous concentrated hydrochloric acid (37%) is employed as the acid component, and the predetermined pH may be set at 2.3, the acid component may be added in an amount of 0.001 mils/g of starch.

Various pH levels may be used to acidify the unmodified starch. In certain embodiments of the present invention, the optimal pH of the acidified unmodified starch may be in the range of 1 to 4, may be in the range of 1.9 to 3.1, and in some embodiments is 2.3.

Various reaction temperatures may be employed in the present invention. In certain embodiments of the present invention, the reaction temperature may be in the range of 100° C. to 180° C., may be in the range of 140° C. to 150° C., and in some embodiments is 140° C.

In addition, various whiteness and absorbance levels may be selected which may be based on a predetermined target value. The whiteness levels identified herein were determined using a Kett Electric Laboratory Whiteness meter model C-1, with a range of 0 to 100. As those in the art can appreciate, different instruments manufactured by different companies can provide different whiteness levels. Thus, the whiteness levels are relative and are to be considered in view of utilization of a Kett Electric Laboratory Whiteness meter. In certain embodiments of the present invention, the whiteness level may range from 50 to 100, may be in the range of 60 to 100, and in some embodiments may be in the range of 65 to 100. The absorbance may be monitored by a spectrophotometer at wavelengths of 420 and 720 nm, wherein the difference between these two points is multiplied by ten and recorded as the color. In certain embodiments of the present invention, the absorbance color maximum may be 20 for the pyrodextrin and may be less than 15. It is important to note that while the examples set forth herein use a whiteness level target of 65 and an absorbance color maximum of 20 for the pyrodextrin, the invention is not limited to these values. Indeed, those skilled in the art can use this knowledge and apply it to other whiteness and absorbance color values.

In some embodiments of the present invention, the reaction temperature may be in the range of 100° C. to 180° C., and the pH may be in the range of 1 to 4 until the maximum resistant starch has been reached while maintaining an acceptable color. The whiteness level may be in the range of 65 to 100.

In other embodiments, the reaction temperature may be in the range of 140° C. to 150° C., and the pH may be in the range of 1.9 and 3.1 until the maximum resistant starch has been reached while maintaining an acceptable color. The whiteness level may be in the range of 65 to 100.

In certain embodiments, the reaction temperature may be 140° C. and the pH may be 2.3 until the maximum resistant starch has been reached while maintaining an acceptable color. The whiteness level may be in the range of 65 to 100.

In one method of the present invention, the starch may have a moisture content ranging from 1% to 15% and may be acidified with an acid-alcohol mixture of ethanol and hydrochloric acid to a pH in the range of 1.9 to 3.1; the reaction temperature may be in the range of 100° C. to 180° C.; and the whiteness level may be in the range of 65 to 100.

Various yields of resistant starch may be obtained by use of the invention. In certain embodiments of the present invention, the percentage yield of the resistant starch may be greater than 45% and may be greater than 50%. In some embodiments, the percentage yield of the resistant starch may be greater than 55%.

The methods of producing resistant starch described herein can further comprise the manufacture of a food product from the resistant starch.

As one skilled in the art will recognize, the present invention provides methods to improve the yield of resistant starch in a dextrin reaction by employing an effective amount of alcohol during the acidification process. The use of alcohol during acidification may eliminate charred starch and, thus, reduce spectrophotometer color. The amount of alcohol used during acidification of the acid-talyzed dextrinization reaction can be optimized at a given temperature and pH to produce an improved resistant starch yield while maintaining an acceptable color.

Having now generally described the invention, the same will be more readily understood through reference to the following examples that are provided by way of illustration, and are not intended to be limiting to the present invention, unless specified.

EXAMPLES

The following examples illustrate the present invention and the advantages thereof.

Example 1

Corn starch at 3% moisture was acidified using an acid-alcohol mixture to acidify starch prior to dextrinization rather than an acid-water mixture. The amount of acid catalyst was adjusted to provide a pH of 2.3 while the amount of alcohol was 0.023 milliliters 190 proof ethanol per gram starch. The pH was measured by slurrying 25 g of acidified starch in 50 ml of deionized water. The acidified starch was then heated to a temperature of 140° C. until a whiteness of 65 was reached. The amount of resistant starch present in the dextrinized starch was 54.0% while the color was 9 with no charred starch present.

This example illustrates that the present invention provides a method to improve the yield of resistant starch in a dextrinization reaction by using an acid-alcohol mixture to acidify starch prior to dextrinization rather than an acid-water mixture while maintaining an acceptable whiteness of 65 and an absorbance color well below 20.

Example 2

Corn starch at 3% moisture was acidified using an acid-water mixture to acidify starch prior to dextrinization rather than an acid-alcohol mixture. The amount of acid catalyst was adjusted to provide a pH of 2.3. The pH was measured by slurrying 25 g of acidified starch in 50 ml of deionized water. The acidified starch was then heated to a temperature of 140° C. until a whiteness of 65 was reached. The amount of resistant starch present in the dextrinized starch was 45.6% while the color was 20 with charred starch present.

This example illustrates that using an acid-water mixture prior to dextrinization results in a lower amount of resistant starch and a higher color at the maximum of 20.

Example 3

Corn starch at 3% moisture was acidified using an acid-alcohol mixture to acidify starch prior to dextrinization rather than an acid-water mixture. The amount of acid catalyst was adjusted to provide a pH of 2.3 while the amount of alcohol was 0.043 milliliters 190 proof ethanol per gram starch. The pH was measured by slurrying 25 g of acidified starch in 50 ml of deionized water. The acidified starch was then heated to a temperature of 140° C. until a whiteness of 65 was reached. The amount of resistant starch present in the dextrinized starch was 57.7%. When the amount of alcohol was lowered to 0.001 milliliters 190 proof ethanol per gram of starch, the amount of resistant starch present was 53.6%. When the amount of ethanol was raised to 0.083 milliters 190 proof ethanol per gram starch, the amount of resistant starch present in the dextrinized starch was 55.6%.

This example illustrates that the present invention provides a method to improve the yield of resistant starch in a dextrinization reaction by using an acid-alcohol mixture to acidify starch prior to dextrinization rather than an acid-water mixture, and that by optimizing the amount of alcohol present during acidification the amount of resistant starch present can be improved.

While the invention has been particularly shown and described with the reference to preferred embodiments thereof, it will be understood by those skilled in the art that they have been presented by way of example only, and not limitation, and various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of producing dextrinized resistant starch comprising:
   acidifying unmodified starch to a selected pH of about 1 to about 4 with an acid-alcohol mixture, wherein the pH is selected to convert the unmodified starch to dextrinized resistant starch when at a reaction temperature in the range of 140° C. to 180° C.;
   heating the acidified unmodified starch to within the reaction temperature range; and
   maintaining the acidified unmodified starch within the reaction temperature range until a maximized yield of dextrinized resistant starch has been obtained while maintaining a whiteness level of at least 65.

2. The method of claim 1, wherein the reaction temperature is in the range of 140° C. and 150° C.

3. The method of claim 2, wherein the reaction temperature is 140° C.

4. The method of claim 1, wherein the selected pH of acidified unmodified starch is between about 1.9 and about 3.1.

5. The method of claim 4, wherein the selected pH of acidified unmodified starch is about 2.3.

6. The method of claim 1, wherein the acid-alcohol mixture includes an alcohol selected from the group consisting of ethanol, methanol, propanol, isopropanol, butanol, and combinations thereof, and wherein the amount of alcohol can be optimized to improve the yield of dextrinized resistant starch.

7. The method of claim 6, wherein the acid-alcohol mixture includes ethanol and wherein the optimal amount of ethanol at 190 proof ranges from 0.001 milliliters per gram starch to 0.4 milliliters per gram starch.

8. The method of claim 7, wherein the optimal amount of ethanol at 190 proof ranges from 0.023 milliliters per gram starch to 0.083 milliliters per gram starch.

9. The method of claim 8 wherein the optimal amount of ethanol at 190 proof is 0.043 milliliters per gram starch.

10. The method of claim 1, wherein the acid-alcohol mixture includes aqueous hydrochloric acid.

11. The method of claim 1, wherein the dextrinized resistant starch has an absorbance color of less than 20.

12. The method of claim 11, wherein the dextrinized resistant starch has an absorbance color of less than 15.

13. The method of claim 1, wherein the moisture content of the unmodified starch is between 1% and 15%.

14. The method of claim 1, wherein the moisture content of the unmodified starch is between 1% and 5%.

15. The method of claim 1, wherein the unmodified starch is acidified before the moisture content is reduced to between 1% and 15%.

16. The method of claim 1, wherein the maximized yield of dextrinized resistant starch is greater than 45%.

17. The method of claim 1, wherein the maximized yield of dextrinized resistant starch is greater than 50%.

18. The method of claim 1, wherein:
the reaction temperature is in the range of 140° C. to 150° C.;
the pH is between about 1.9 to about 3.1; and
the whiteness level is at least 65.

19. The method of claim 1, wherein:
the reaction temperature is 140° C.;
the pH is about 2.3; and
the whiteness level is at least 65.

20. The method of claim 1, wherein:
the unmodified starch has a moisture content ranging from 1% to 15% and is acidified with an acid-alcohol mixture of ethanol and hydrochloric acid to a pH between about 1.9 and about 3.1;
the reaction temperature is in the range of 140° C. to 180° C.; and the whiteness level is at least 65.

21. The method of claim 20, wherein the unmodified starch is acidified to a pH of about 2.3 and then heated to a reaction temperature of 140° C.

22. The method of claim 1, wherein the unmodified starch is derived from corn.

23. The method of claim 1, wherein the unmodified starch is derived from a feed stock selected from the group consisting of corn, potatoes, rice, casava, wheat, and combinations thereof.

24. The method of claim 1, further comprising:
manufacturing a food product from the dextrinized resistant starch.

25. The method of claim 1, wherein the acidifying is performed with an acid-alcohol mixture comprising at least one of an alcohol selected from the group consisting of ethanol, methanol, propanol, isopropanol, butanol, and combinations thereof.

* * * * *